(12) United States Patent
Moorer et al.

(10) Patent No.: US 7,496,627 B2
(45) Date of Patent: Feb. 24, 2009

(54) AUTOMATION CONTROL SYSTEM HAVING DIGITAL LOGGING

(75) Inventors: Seale Moorer, Westerville, OH (US);
Eric Eichensehr, Westerville, OH (US)

(73) Assignee: Exceptional Innovation, LLC, Westerville, OH (US)

( * ) Notice: Subject to any disclaimer, the term of this patent is extended or adjusted under 35 U.S.C. 154(b) by 0 days.

(21) Appl. No.: 11/686,884

(22) Filed: Mar. 15, 2007

(65) Prior Publication Data

US 2007/0220142 A1 Sep. 20, 2007

Related U.S. Application Data

(60) Provisional application No. 60/857,774, filed on Nov. 9, 2006, provisional application No. 60/747,726, filed on May 19, 2006, provisional application No. 60/746,287, filed on May 3, 2006, provisional application No. 60/793,257, filed on Apr. 20, 2006, provisional application No. 60/786,119, filed on Mar. 27, 2006, provisional application No. 60/785,275, filed on Mar. 24, 2006, provisional application No. 60/782,734, filed on Mar. 16, 2006, provisional application No. 60/782,598, filed on Mar. 16, 2006, provisional application No. 60/782,635, filed on Mar. 16, 2006, provisional application No. 60/782,596, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006.

(51) Int. Cl.
*G06F 15/16* (2006.01)

(52) U.S. Cl. .......... 709/204; 709/205; 709/214; 709/215; 709/216; 715/733; 715/759; 345/2.2; 345/3.2

(58) Field of Classification Search .......... 709/204, 709/205, 214, 215, 216; 345/733, 759; 715/2.2, 715/3.2
See application file for complete search history.

(56) References Cited

U.S. PATENT DOCUMENTS

| | | | |
|---|---|---|---|
| 4,567,557 A | 1/1986 | Burns |
| 4,808,841 A | 2/1989 | Ito et al. |
| 4,989,081 A | 1/1991 | Miyagawa et al. |
| 5,086,385 A | 2/1992 | Launey et al. |
| 5,105,186 A | 4/1992 | May |
| 5,218,552 A | 6/1993 | Stirk et al. |
| 5,237,305 A | 8/1993 | Ishijuro et al. |
| 5,579,221 A | 11/1996 | Mun |
| 5,598,523 A | 1/1997 | Fujita |
| 5,621,662 A | 4/1997 | Humphries et al. |
| 5,666,172 A | 9/1997 | Ida et al. |
| 5,706,191 A | 1/1998 | Bassett et al. |
| 5,706,290 A | 1/1998 | Shaw et al. |

(Continued)

*Primary Examiner*—Jinsong Hu
(74) *Attorney, Agent, or Firm*—McGuireWoods LLP

(57) ABSTRACT

A convergence and automation system includes (a) an internet-protocol based network, (b) hardware implemented with a web service for devices (WSD) protocol, wherein the hardware includes a plurality of devices connected to the network, each device being configured to perform at least one service, and a server connected to network and configured to control the devices for converging and automating the services thereof; and (c) software implemented with the WSD protocol and configured to establish communication among the sever and the devices and perform a logging function to record events and errors taking places in the convergence and automation system.

11 Claims, 18 Drawing Sheets

U.S. PATENT DOCUMENTS

| | | | |
|---|---|---|---|
| 5,748,444 A | 5/1998 | Honda et al. |
| 5,787,259 A | 7/1998 | Haroun |
| 5,850,340 A | 12/1998 | York |
| 5,877,957 A | 3/1999 | Bennett |
| 5,922,047 A | 7/1999 | Newlin et al. |
| 5,956,025 A | 9/1999 | Goulden et al. |
| 6,020,881 A | 2/2000 | Naughton et al. |
| 6,029,092 A | 2/2000 | Stein |
| 6,061,602 A | 5/2000 | Meyer |
| 6,112,127 A | 8/2000 | Bennett |
| 6,139,177 A | 10/2000 | Venkatraman et al. |
| 6,147,601 A | 11/2000 | Sandelman et al. |
| 6,154,681 A | 11/2000 | Drees et al. |
| 6,160,477 A | 12/2000 | Sandelman et al. |
| 6,175,872 B1 | 1/2001 | Neumann et al. |
| 6,182,094 B1 | 1/2001 | Humpleman et al. |
| 6,192,282 B1 | 2/2001 | Smith et al. |
| 6,198,479 B1 | 3/2001 | Humpleman et al. |
| 6,201,523 B1 | 3/2001 | Akiyama et al. |
| 6,222,729 B1 | 4/2001 | Yoshikawa |
| 6,243,707 B1 | 6/2001 | Humpleman et al. |
| 6,263,260 B1 | 7/2001 | Bodmer et al. |
| 6,275,922 B1 | 8/2001 | Bertsch |
| 6,278,676 B1 | 8/2001 | Anderson et al. |
| 6,288,716 B1 | 9/2001 | Humpleman et al. |
| 6,313,990 B1 | 11/2001 | Cheon |
| 6,314,326 B1 | 11/2001 | Fuchu |
| 6,353,853 B1 | 3/2002 | Gravlin |
| 6,385,495 B1 | 5/2002 | Bennett |
| 6,389,331 B1 | 5/2002 | Jensen et al. |
| 6,402,109 B1 | 6/2002 | Dittmer |
| 6,405,103 B1 | 6/2002 | Ryan et al. |
| 6,456,892 B1 | 9/2002 | Dara-Abrams et al. |
| 6,462,654 B1 | 10/2002 | Sandelman et al. |
| 6,473,661 B1 | 10/2002 | Wollner |
| 6,496,575 B1 | 12/2002 | Vasell et al. |
| 6,522,346 B1 | 2/2003 | Meyer |
| 6,523,696 B1 | 2/2003 | Saito et al. |
| 6,526,581 B1 | 2/2003 | Edson |
| 6,546,419 B1 | 4/2003 | Humpleman et al. |
| 6,580,950 B1 | 6/2003 | Johnson et al. |
| 6,587,739 B1 | 7/2003 | Abrams et al. |
| 6,609,038 B1 | 8/2003 | Croswell et al. |
| 6,615,088 B1 | 9/2003 | Myer et al. |
| 6,633,781 B1 | 10/2003 | Lee et al. |
| 6,640,141 B2 | 10/2003 | Bennett |
| 6,663,781 B1 | 12/2003 | Huling |
| 6,690,411 B2 | 2/2004 | Naidoo et al. |
| 6,690,979 B1 | 2/2004 | Smith |
| 6,735,619 B1 | 5/2004 | Sawada |
| 6,756,998 B1 | 6/2004 | Bilger |
| 6,763,040 B1 | 7/2004 | Hite et al. |
| 6,778,868 B2 | 8/2004 | Imamura et al. |
| 6,782,294 B2 | 8/2004 | Reich et al. |
| 6,792,319 B1 | 9/2004 | Bilger |
| 6,792,323 B2 | 9/2004 | Krzyzanowski et al. |
| 6,823,223 B2 | 11/2004 | Gonzales et al. |
| 6,834,208 B2 | 12/2004 | Gonzales et al. |
| 6,838,978 B2 | 1/2005 | Aizu et al. |
| 6,845,275 B2 | 1/2005 | Gasiorek et al. |
| 6,850,149 B2 | 2/2005 | Park |
| 6,859,669 B2 | 2/2005 | An |
| 6,865,428 B2 | 3/2005 | Gonzales et al. |
| 6,868,292 B2 | 3/2005 | Ficco |
| 6,868,293 B1 | 3/2005 | Schurr et al. |
| 6,870,555 B2 | 3/2005 | Sekiguchi |
| 6,891,838 B1 | 5/2005 | Petite |
| 6,912,429 B1 | 6/2005 | Bilger |
| 6,924,727 B2 | 8/2005 | Nagaoka et al. |
| 6,928,576 B2 | 8/2005 | Sekiguchi |
| 6,930,599 B2 | 8/2005 | Naidoo et al. |
| 6,957,110 B2 | 10/2005 | Wewalaarachchi et al. |
| 6,957,275 B1 | 10/2005 | Sekiguchi |
| 6,961,763 B1 | 11/2005 | Wang et al. |
| 6,965,935 B2 | 11/2005 | Diong |
| 6,967,565 B2 | 11/2005 | Lingermann |
| 6,980,868 B2 | 12/2005 | Huang et al. |
| 6,990,379 B2 | 1/2006 | Gonzales et al. |
| 7,047,092 B2 | 5/2006 | Wimsatt |
| 7,203,486 B2 | 4/2007 | Patel |
| 7,380,250 B2 | 5/2008 | Schechter et al. |
| 2001/0034754 A1 | 10/2001 | Elwahab et al. |
| 2001/0036192 A1 | 11/2001 | Chiles et al. |
| 2001/0039460 A1 | 11/2001 | Aisa |
| 2002/0000092 A1 | 1/2002 | Sharood et al. |
| 2002/0016639 A1 | 2/2002 | Smith |
| 2002/0029085 A1 | 3/2002 | Park |
| 2002/0031120 A1 | 3/2002 | Rakib |
| 2002/0033760 A1 | 3/2002 | Kobayashi |
| 2002/0035404 A1 | 3/2002 | Ficco et al. |
| 2002/0044042 A1 | 4/2002 | Christensen |
| 2002/0047774 A1 | 4/2002 | Christensen |
| 2002/0111698 A1 | 8/2002 | Graziano et al. |
| 2002/0152311 A1 | 10/2002 | Veltman et al. |
| 2002/0165953 A1 | 11/2002 | Diong |
| 2002/0180579 A1 | 12/2002 | Nagaoka et al. |
| 2002/0194328 A1 | 12/2002 | Hallenbeck |
| 2002/0196158 A1 | 12/2002 | Lee |
| 2003/0009515 A1 | 1/2003 | Lee et al. |
| 2003/0028270 A1 | 2/2003 | Peterson et al. |
| 2003/0033028 A1 | 2/2003 | Bennett |
| 2003/0037166 A1 | 2/2003 | Uneo et al. |
| 2003/0040812 A1 | 2/2003 | Gonzales et al. |
| 2003/0040813 A1 | 2/2003 | Gonzales et al. |
| 2003/0040819 A1 | 2/2003 | Gonzales |
| 2003/0065407 A1 | 4/2003 | Johnson et al. |
| 2003/0074088 A1 | 4/2003 | Gonzales |
| 2003/0083758 A1 | 5/2003 | Williamson |
| 2003/0101304 A1 | 5/2003 | King et al. |
| 2003/0198938 A1 | 10/2003 | Murray |
| 2003/0200009 A1 | 10/2003 | von Kannewurff |
| 2004/0003051 A1 | 1/2004 | Krzyzanowski et al. |
| 2004/0004810 A1 | 1/2004 | Kim |
| 2004/0010327 A1 | 1/2004 | Terashima et al. |
| 2004/0010561 A1 | 1/2004 | Kim |
| 2004/0039459 A1 | 2/2004 | Daugherty et al. |
| 2004/0092282 A1 | 5/2004 | Kim et al. |
| 2004/0133314 A1 | 7/2004 | Ehlers |
| 2004/0138768 A1 | 7/2004 | Murray |
| 2004/0143629 A1 | 7/2004 | Bodin et al. |
| 2004/0176877 A1 | 9/2004 | Hesse |
| 2004/0213384 A1 | 10/2004 | Alles |
| 2004/0215694 A1 | 10/2004 | Podolsky |
| 2004/0215778 A1 | 10/2004 | Hesse et al. |
| 2004/0215816 A1 | 10/2004 | Hayes et al. |
| 2004/0237107 A1 | 11/2004 | Staples |
| 2004/0243257 A1 | 12/2004 | Theimer |
| 2004/0249922 A1 | 12/2004 | Hackman |
| 2004/0260407 A1 | 12/2004 | Wimsatt |
| 2004/0260427 A1 | 12/2004 | Wimsatt |
| 2004/0267385 A1 | 12/2004 | Lingemann |
| 2004/0267876 A1 | 12/2004 | Kakivaya et al. |
| 2004/0267909 A1 | 12/2004 | Autret |
| 2005/0009498 A1 | 1/2005 | Ho |
| 2005/0021805 A1 | 1/2005 | Petris |
| 2005/0035717 A1 | 2/2005 | Adamson |
| 2005/0055108 A1 | 3/2005 | Gonzales |
| 2005/0071419 A1 | 3/2005 | Lewontin |
| 2005/0080879 A1 | 4/2005 | Kim et al. |
| 2005/0085930 A1 | 4/2005 | Gonzales |
| 2005/0090915 A1 | 4/2005 | Geiwitz |
| 2005/0096753 A1 | 5/2005 | Arling et al. |
| 2005/0107897 A1 | 5/2005 | Callaghan |
| 2005/0108091 A1 | 5/2005 | Sotak |

| | | | | | |
|---|---|---|---|---|---|
| 2005/0113021 A1 | 5/2005 | Gosieski, Jr. et al. | 2005/0267605 A1 | 12/2005 | Lee et al. |
| 2005/0113943 A1 | 5/2005 | Nian | 2005/0271355 A1 | 12/2005 | Gilor |
| 2005/0119767 A1 | 6/2005 | Kiwimagi et al. | 2006/0004920 A1 | 1/2006 | Hallenbeck |
| 2005/0119793 A1 | 6/2005 | Amundson et al. | 2006/0009861 A1 | 1/2006 | Bonasia et al. |
| 2005/0125083 A1 | 6/2005 | Kiko | 2006/0020353 A1 | 1/2006 | Gonzales et al. |
| 2005/0131551 A1 | 6/2005 | Ruutu | 2006/0053234 A1 | 3/2006 | Kumar et al. |
| 2005/0131553 A1 | 6/2005 | Yoon et al. | 2006/0058900 A1 | 3/2006 | Johanson et al. |
| 2005/0131558 A1 | 6/2005 | Braithwaite | 2006/0106933 A1 * | 5/2006 | Huang et al. ............ 709/227 |
| 2005/0132405 A1 | 6/2005 | AbiEzzi | 2006/0126646 A1 | 6/2006 | Bedingfield, Sr. |
| 2005/0149758 A1 | 7/2005 | Park | 2006/0155802 A1 * | 7/2006 | He et al. ................ 709/203 |
| 2005/0159823 A1 | 7/2005 | Hayes et al. | 2007/0053376 A1 * | 3/2007 | Oshima et al. ........... 370/462 |
| 2005/0198063 A1 | 9/2005 | Thomas et al. | 2007/0083679 A1 | 4/2007 | Kikuchi |
| 2005/0198188 A1 | 9/2005 | Hickman | 2007/0104332 A1 | 5/2007 | Clemens et al. |
| 2005/0198304 A1 | 9/2005 | Oliver et al. | | | |
| 2005/0232583 A1 * | 10/2005 | Kubota ................ 386/46 | * cited by examiner | | |

| Log Information | Showing Trace | Showing Errors | |
|---|---|---|---|
| Time | Type | Component | Message |
| 3/14/2005 12:25:10 PM | Trace | ConfigService | Service configs loaded from: Weather.xml |
| 3/14/2005 12:25:10 PM | Trace | ConfigService | Service configs loaded from: Virtual.xml |
| 3/14/2005 12:25:10 PM | Trace | ConfigService | Service configs loaded from: VantageDimmers.xml |
| 3/14/2005 12:25:10 PM | Trace | ConfigService | Service configs loaded from: PanasonicCamera.xml |
| 3/14/2005 12:25:10 PM | Trace | ConfigService | Service configs loaded from: NewThermostats.xml |
| 3/14/2005 12:25:10 PM | Trace | ConfigService | Service configs loaded from: NewRouters.xml |
| 3/14/2005 12:25:10 PM | Trace | ConfigService | Service configs loaded from: Musica.xml |
| 3/14/2005 12:25:10 PM | Trace | ConfigService | Service configs loaded from: LightingZWave.xml |
| 3/14/2005 12:25:10 PM | Trace | ConfigService | Service configs loaded from: LightingHomeWorks.xml |
| 3/14/2005 12:25:10 PM | Trace | ConfigService | Service configs loaded from: LightingALC.xml |
| 3/14/2005 12:25:10 PM | Trace | ConfigService | Service configs loaded from: Lighting.xml |
| 3/14/2005 12:25:10 PM | Trace | ConfigService | Service configs loaded from: JandySpa.xml |
| 3/14/2005 12:25:10 PM | Trace | ConfigService | Service configs loaded from: IR.xml |
| 3/14/2005 12:25:10 PM | Trace | ConfigService | Service configs loaded from: DigiLinX.xml |
| 3/14/2005 12:25:10 PM | Trace | ConfigService | Service configs loaded from: AxisCamera.xml |
| 3/14/2005 12:25:10 PM | Trace | ConfigService | Service configs loaded from: Automation.xml |
| 3/14/2005 12:25:10 PM | Trace | ConfigService | Service configs loaded from: Audio.xml |
| 3/14/2005 12:25:10 PM | Trace | ConfigService | Service configs loaded from: Alarms.xml |
| 3/14/2005 12:25:10 PM | Trace | ConfigService | Getting service configs. |

FIG. 5

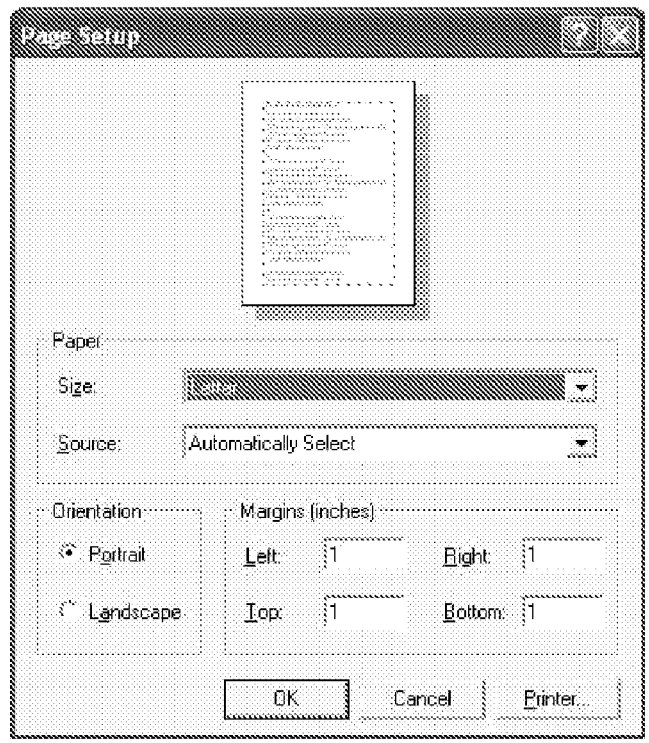

FIG. 7(b)

```
3/14/2005 12:25:11 PM Trace: (DiscoveryHandler) Starting discovery listener (udp).
3/14/2005 12:25:11 PM Trace: (DiscoveryHandler) Adding hosted service:
uuid:9DBD3D1B-2510-446d-B334-BE41D127FC41
3/14/2005 12:25:11 PM Trace: (DiscoveryHandler) Adding hosted service:
uuid:02b0f509-dbf3-47a8-a2c9-fb3f1b1d8f63
3/14/2005 12:25:11 PM Trace: (DiscoveryHandler) Sending hello for service:
uuid:02b0f509-dbf3-47a8-a2c9-fb3f1b1d8f63
3/14/2005 12:25:11 PM Trace: (DiscoveryHandler) Sending hello for service:
uuid:9DBD3D1B-2510-446d-B334-BE41D127FC41
3/14/2005 12:25:11 PM Trace: (DiscoveryHandler) Adding hosted service:
uuid:02b0f509-dbf3-47a8-a2c9-fb3f1b1d8f64
3/14/2005 12:25:11 PM Trace: (DiscoveryHandler) Sending hello for service:
uuid:02b0f509-dbf3-47a8-a2c9-fb3f1b1d8f64
3/14/2005 12:25:12 PM Trace: (DiscoveryHandler) Adding hosted service:
uuid:02b0f509-dbf3-47a8-a2c9-fb3f1b1d8f65
3/14/2005 12:25:12 PM Trace: (DiscoveryHandler) Sending hello for service:
uuid:02b0f509-dbf3-47a8-a2c9-fb3f1b1d8f65
```

FIG. 7(c)

| | |
|---|---|
| Starting Services | 3/14/2005 12:25:10 PM - Trace: (ServiceProvider) Main method called. |
| | 3/14/2005 12:25:10 PM - Trace: (ServiceProvider) Starting as a windows service. |
| | 3/14/2005 12:25:10 PM - Trace: (ServiceProvider) Starting hosted services. |
| Loading Configurations | 3/14/2005 12:25:10 PM - Trace: (ConfigService) Getting enabled service configs. |
| | 3/14/2005 12:25:10 PM - Trace: (ConfigService) Getting service configs. |
| | 3/14/2005 12:25:10 PM - Trace: (ConfigService) App service configs loaded. |
| | 3/14/2005 12:25:10 PM - Trace: (ConfigService) Service configs loaded from: Virtual.xml |
| | 3/14/2005 12:25:10 PM - Trace: (ConfigService) Service configs loaded from: Alarms.xml |
| | 3/14/2005 12:25:10 PM - Trace: (ConfigService) Service configs loaded from: Audio.xml |
| | 3/14/2005 12:25:10 PM - Trace: (ConfigService) Service configs loaded from: Camera.xml |
| | 3/14/2005 12:25:10 PM - Trace: (ConfigService) Service configs loaded from: IR.xml |
| | 3/14/2005 12:25:10 PM - Trace: (ConfigService) Service configs loaded from: Lighting.xml |
| | 3/14/2005 12:25:10 PM - Trace: (ConfigService) Service configs loaded from: Automation.xml |
| | 3/14/2005 12:25:10 PM - Trace: (ConfigService) Service configs loaded from: ConfigService.xml |
| | 3/14/2005 12:25:10 PM - Trace: (ConfigService) Service configs loaded from: NewThermostats.xml |
| | 3/14/2005 12:25:10 PM - Trace: (ConfigService) All service configs loaded. |
| Opening Communications: Serial, HTTP, UDP, TCP | 3/14/2005 12:25:11 PM - Trace: (SerialPortController) Creating serial port controller for COM17. |
| | 3/14/2005 12:25:11 PM - Trace: (HttpController) Creating http controller for http://10.0.1.89. |
| | 3/14/2005 12:25:11 PM - Trace: (UdpController) Creating udp controller for 10.15.0.16. |
| | 3/14/2005 12:25:11 PM - Trace: (IrGlobalCacheController) About to create new irGlobalCache |
| | 3/14/2005 12:25:11 PM - Trace: TcpClient Creating Global ir TCP Client for 10.0.1.35. |
| | 3/14/2005 12:25:11 PM - Trace: (IrGlobalCacheController) About to create new irGlobalCache |
| | 3/14/2005 12:25:11 PM - Trace: TcpClient for 10.0.1.35 found. Adding reference count. |
| | 3/14/2005 12:25:11 PM - Trace: (IrGlobalCacheController) About to create new irGlobalCache |
| | 3/14/2005 12:25:11 PM - Trace: (SerialPortController) Creating serial port controller for COM17. |
| | 3/14/2005 12:25:11 PM - Trace: (SerialPortController) Serial controller for COM17 found. Adding reference count. |

FIG. 9

| Message Text | Description |
| --- | --- |
| Adding Hosted Service | The service that controls a device has been successfully added to the hosted services on the system. |
| Bye Received | A service has left the network. |
| Clearing subscriptions | All subscriptions are cleared in anticipation of a shutdown. |
| Creating Serial Port Controller | The system has created an object that will manage communications for a specific serial port. The system must do this for each serial device that is configured into the system; The system needs to know the correct COM port number. |
| Creating HTTP controller | The system has created a HTTP controller for a device that is connected via Ethernet and communicated with using HTTP. The device's unique IP address is part of this process. |
| Creating UDP controller | The system has created a UDP controller for a device that is connected via Ethernet and communicated with using UDP. The device's unique IP address is part of this process. |
| Firing Service Availability Event | The Control Point component issues a response to a hello – indicated it is aware of the availability status of the service. |
| Getting Script Templates | A script has been called and is being accessed by the system. |
| Hello received | On startup, services advertise their presence with a hello UDP message. |
| Message Received | A message has been received by the system from a device. |
| Probe received | Services that join the network after initial startup has already been completed advertise their presence with a UDP probe. |
| Received Non-conforming Message | Some devices send more information back to the system than is actually needed to accomplish the specified tasks. This information is noted as a Non-conforming message. The non-conforming information is itself a part of this message. |
| Received Null Event | No response has been received for a command. |
| Removing Subscription | The Subscription Manager subscribes and unsubscribes to services based on the needs of the user. If, for example, the user navigates to a page with lighting controls, the Subscription Manager subscribes to the lighting service while the user is on that page. When the use leaves that page, the Subscription Manager unsubscribes from the lighting service. |
| Sending Hello for service | A service has announced its presence to the system. |
| Sending Message | A message, usually with data, has been sent from the system to a device. |
| Sending Probe matches | Components that have received a UDP Probe respond. This indicates they are aware of the probing service's presence on the network. |
| Sent/Sending unsubscribe | The Subscription Manager subscribes and unsubscribes to services based on the needs of the user. For example, if the user navigates to a page with lighting controls, the Subscription Manager subscribes to the lighting service while the user is on that page. When the user leaves that page, the Subscription Manager unsubscribes from the lighting service. |
| Serial Port Controller Found | The system has found a Serial Port Controller that is assigned to a specific serial port. |
| Serial Port Closed | Serial port has been closed. |
| Service Configs loaded | The configuration files for specific devices have been loaded by the system. |
| Starting Service | The service that controls a device has been started. |
| Stopping Service | A service is stopped in anticipation of a shutdown. |
| Subscriptions cleared | All subscriptions are cleared in anticipation of a shutdown. |

FIG. 10

| Message Text | Notes |
|---|---|
| An error has occurred sending the probe message. | Networking error. A service was unable to be started successfully. Restart services. |
| Error occurred sending events/messages | Networking error – event or message did not get sent successfully. Could also be a configuration issue or indication that a device has failed without its corresponding service closing. This error message usually includes additional details on the specific nature of the error. |
| Error sending bye message. | Networking error. A service was unable to be closed successfully. Restart services. |
| Error sending hello message. | Networking error. A service was unable to be started successfully. Restart services. |

FIG. 11(a)

| Message Text | Notes |
| --- | --- |
| Could not create an instance of this type | |
| Error Occurred Sending Events | Either configuration issue or a device has failed without its service closing. |
| Partition Name Invalid | This error indicates a disconnection between Life\|ware's configuration for the system and the system's actual configuration. This may indicate that Life\|ware's XML config file has been changed. Recheck the config for this system to ensure that it matches the config on the device itself. |
| App setting has an invalid value | One of Life\|ware's configuration settings for the device is not valid. Recheck the device configuration. |
| Zone Name Invalid | This error indicates a disconnection between Life\|ware's configuration for the system and the system's actual configuration. This may indicate that Life\|ware's XML config file has been changed. Recheck the config for this system to ensure that it matches the config on the device itself. |
| Networx Device Not responding | This error indicates a disconnection between Life\|ware's configuration for the system and the GE Networx security system's actual configuration. This |
| Received restore for zone {0} which does not have partition mapping. | |
| Received alarm for zone {0}, which does not have partition mapping. | This error indicates a disconnection between Life\|ware's configuration for the system and the system's actual configuration. This may indicate that Life\|ware's XML config file has been changed. Recheck the config for this system to ensure that it matches the config on the device itself. |
| Port Open Failure | Serial Port could not be opened. Check config to ensure the correct Serial Port number has been used. |

FIG. 11(b)

| Message Text | Notes |
|---|---|
| Could not retrieve script templates | Error occurred with Scripting. Check script. |
| Could not load schedules as the config file is corrupt | Error occurred with scheduling. |
| Could not execute schedule | Error occurred with scheduling. |
| Could not save schedules to file | Error occurred with scheduling. |
| Could not compile script | Error occurred with Scripting. Check script. |
| Execution of script {0} received an error | Error occurred with Scripting. Check script. |
| Cannot perform action, script is in use. | Error occurred with Scripting. Check script. |

FIG. 11(c)

| Message Text | Notes |
| --- | --- |
| Type could not be loaded. Please check to make sure the file containing {x} is in the bin directory. | Indicates a missing DLL or system file. Ensure that the latest Life\|ware file versions have been installed |
| The constructor for {0} has thrown an exception. Please check to make sure the file containing {x} is in the bin directory. | Indicates a missing DLL or system file. Ensure that the latest Life\|ware file versions have been installed |
| Could not create device | Service provider was unable to create a service for a device on the system. Indicates a missing DLL or system file. Ensure that the latest Life\|ware file versions have been installed |

FIG. 11(d)

AUTOMATION CONTROL SYSTEM HAVING DIGITAL LOGGING

CROSS REFERENCE TO RELATED APPLICATION

This application claims priority to and the benefit of: Provisional Patent Application No. 60/782,734 filed on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al.; Provisional Patent Application No. 60/782,596 filed on Mar. 16, 2006, entitled AUTOMATION CONTROL SYSTEM HAVING DIGITAL MEDIA STREAMING, to Seale MOORER et al.; Provisional Patent Application No. 60/782,598 filed on Mar. 16, 2006, entitled AUTOMATION CONTROL SYSTEM HAVING DIGITAL LOGGING, to Seale MOORER et al.; Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al.; Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al.; Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent Application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. Further, this application is related to the following U.S. Patent Applications: U.S. patent application Ser. No. (11/686,826), entitled NETWORK BASED DIGITAL ACCESS POINT DEVICE, filed Mar. 15, 2007, to Seale Moorer, et al., having U.S. Pat. No. (11/686,836), entitled INTERNET PROTOCOL BASED MEDIA STREAMING SOLUTION, filed Mar. 15, 2007, to Seale Moorer, et al., having U.S. patent application Ser. No. (11/686,896), entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007, to Seale Moorer, et al., having U.S. patent application Ser. No. (11/686,893), entitled USER CONTROL INTERFACE FOR CONVERGENCE AND AUTOMATION SYSTEM, filed Mar. 15, 2007, to Seale Moorer, et al., having U.S. patent application Ser. No. (11/686,846), entitled DEVICE AUTOMATION USING NETWORKED DEVICE CONTROL HAVING A WEB SERVICES FOR DEVICES STACK, filed Mar. 15, 2007, to Seale Moorer, et al., having U.S. patent application Ser. No. (11/686,875), entitled AUTOMATION CONTROL SYSTEM HAVING A CONFIGURATION TOOL, filed Mar. 15, 2007, to Seale Moorer, et al., and U.S. patent application Ser. No. (11/686,889), entitled AUTOMATION CONTROL SYSTEM HAVING DEVICE SCRIPTING, filed Mar. 15, 2007, to Seale Moorer, et al., having Attorney Docket No.: 2047672-5023US; which are all hereby expressly incorporated by reference for all purposes as if fully set forth herein.

BACKGROUND OF THE INVENTION

1. Field of the Invention

The invention is directed to monitoring an automation and convergence system, and more particularly to monitoring the automation and convergence system using a logging function.

2. Related Art

Household, academic facility and/or business spaces now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), etc. Typically, a CD/DVD player from one company comes with its own remote control and an amplifier by an entirely different company comes with its own remote control. The same space may have a PC with its keyboard and mouse, and yet another company's portable MP3 player with its own control switches. While each audio device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play an MP3 file saved in a PC hard disk drive in one room or area (a child's bedroom) on speakers located in another room or area (an entertainment room). Thus, in order for a user to enjoy music of his or her choice whenever and wherever he or she wants, each room needs to be equipped with all the necessary audio/video equipment and digital audio/video content.

Also, the audio/video devices are not designed to communicate with other home devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes a universal remote, as is known in the art, the result is a plurality of devices that are separately operated and are operated separately from a single universal remote. These devices do not converge as described above. Moreover, the devices lack any ability to monitor or log their actions so as to better ascertain the performance and troubleshoot the devices.

Accordingly, there is a need for a solution to the aforementioned need to monitor the accessibility, connectability, controlability and convergence issues.

SUMMARY OF THE INVENTION

The invention meets the foregoing needs using an automation specific IP based automation protocol, which results in a significant increase in discovery and communications between devices and other advantages apparent from the discussion herein.

Accordingly, in one aspect of the invention, a convergence and automation system includes an internet-protocol based network, hardware implemented with a web service for devices (WSD) protocol, the hardware includes a plurality of devices connected to the network, each device being configured to perform at least one service, and a server connected to network and configured to control the devices to converge and automate the services thereof, and the hardware configured to establish communication among the server and the devices and perform a logging function to record events and errors taking place in the convergence and automation system.

The hardware may include at least one client connected to the network and configured to control at least a portion of the services of the plurality devices. Each of the plurality of devices may be selected from the group consisting of an audio device, video device, intercom device, lighting control device, security device and HVAC device. The at least one client may be selected from the group consisting of a television, personal computer, personal data assistant and remote controller. The logging function may include generating messages describing the events and errors taking place in the convergence and automation system. Each of the messages may include a time stamp component, message type component, process component, and description of event component. The messages may include trace messages describing the events, and error messages describing the errors. The trace messages may include service-related messages that include a recording of the events related to the services performed by the devices, discovery messages that include a recording of the events related to introduction and acknowledgement of new services in the software, messaging messages that include a recording of the events related to communication among the devices, and subscription management messages that include a recording of the events related to subscription history of the services among the devices. The error messages may include configuration error messages that include a recording of the errors related to settings or triggering of the devices, network error messages that include a recording of the errors related to failure to communicate between the hardware and software, missing system file messages that include a recording of the errors related to missing necessary files, and scripting/scheduling error messages that include a recording of the errors related to errors in scripts or scheduling of the scripts. The logging function may include filtering, sorting and searching the messages. The logging function may include printing a report of the messages.

Accordingly, in another aspect of the invention, an article includes a machine readable medium having embodied thereon a program, the program being executable by a machine to perform a logging function to record events and errors taking places in a convergence and automation system, the convergence and automation system including an internet-protocol based network, hardware implemented with a web service for devices (WSD) protocol and software implemented with the WSD protocol and configured to establish communication in the hardware and perform the logging function to record the events and errors.

The hardware may include a plurality of devices connected to the network, each device being configured to perform at least one service, and a server connected to network and configured to control the devices for converging and automating the services thereof. The software may be configured to establish communication among the server and the devices. The logging function may include generating messages describing the events and error taking places in the convergence and automation system. The messages may include a time stamp component, message type component, process component, and description of event component. The messages may include trace messages describing the events, and error messages describing the errors. The trace messages may include service-related messages that include a recording of the events related to the services performed by the devices, discovery messages that include a recording of the events related to introduction and acknowledgement of new services in of the software, messaging messages that include a recording of the events related to communication among the devices, and subscription management messages that include a recording of the events related to subscription history of the services among the devices. The error messages may include configuration error messages recording the errors related to settings or triggering of the devices, network error messages recording the errors related to failure to communicate between the hardware and software, missing system file messages recording the errors related to missing necessary files, and scripting/scheduling error messages recording the errors related to errors in scripts or scheduling of the scripts. The logging function may include filtering, sorting and searching the messages.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 2 shows a screen capture image of a log viewer, constructed according to the principles of the invention;

FIG. 3 shows a screen capture image of the log viewer of FIG. 2 being configured for filtering messages;

FIG. 5 shows a screen capture image of the log viewer of FIG. 2 being used to sort messages;

FIG. 7(b) shows a screen capture image of a page setup window constructed according to the principles of the invention;

FIG. 7(c) shows a screen capture image of the print preview window of FIG. 7(a) with a word-wrapping function enabled;

FIG. 9 shows a portion of a service provider logging file constructed according to the principles of the invention;

FIG. 10 shows a table listing common trace messages alphabetically by the first letter of the message text constructed according to the principles of the invention;

FIG. 11(a) shows a table listing networking error messages alphabetically by the first letter of the message text constructed according to the principles of the invention;

FIG. 11(b) shows a table listing configuration error messages alphabetically by the first letter of the message text constructed according to the principles of the invention;

FIG. 11(c) shows a table listing script/schedule error messages alphabetically by the first letter of the message text constructed according to the principles of the invention; and FIG. 11(d) shows a table listing missing system file error messages alphabetically by the first letter of the message text constructed according to the principles of the invention.

DETAILED DESCRIPTION OF THE INVENTION

Figure 1:
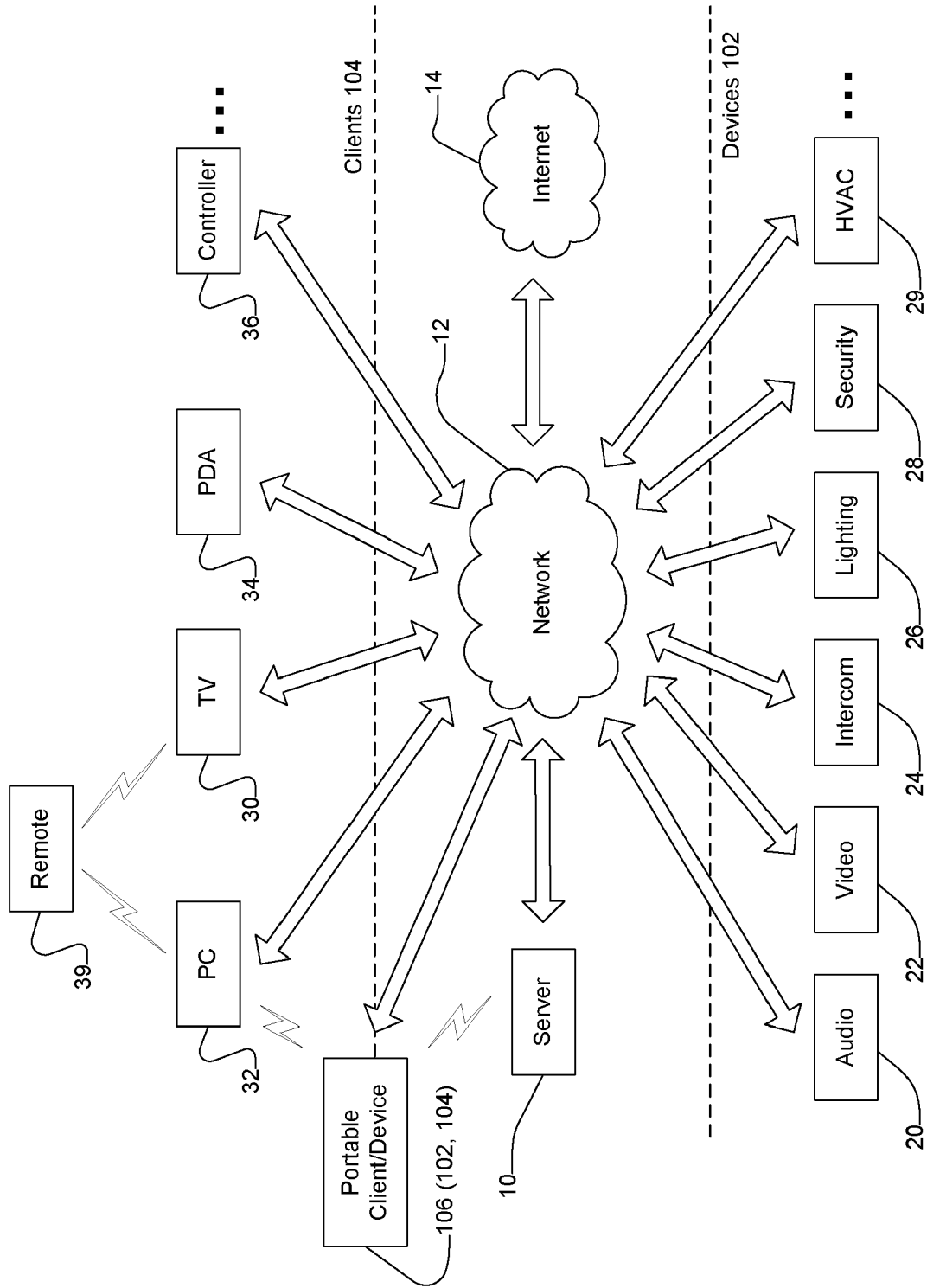
FIG. 1 shows an overview of a convergence and automation system (CAS) constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 shows an overview of a convergence and automation system (CAS) for use with a portable remote control, communications and media consumption device constructed according to the principles of the invention. The CAS solution may be a combination of hardware and software. The hardware may include a server 10 connected to a network 12 (e.g. IP based wired or wireless network such as an Ethernet network) and may possibly be connected to the internet 14, devices 102 (e.g. audio 20, video 22, intercom 24, lighting 26, security system 28, HVAC 39, and the like) and clients 104 (e.g. TV 30, personal computer (PC) 32, personal digital assistance (PDA) 34, controller 36 such as a control panel, game controller (i.e. XBox™, not shown) and the like). Moreover, the clients 104 may include a remote control 39 or a portable device 106 for remote control, communications and media consumption, which may be configured to function as both the client and device. The server 10 may be any type of computer, such as a PC connected to the network 12. The clients 104 such as clients 30, 32, 34, 36 provide a user with control over the devices 102 such as devices 20, 22, 24, 26, 28, 29.

The software (i.e. application) enables the hardware devices 102 and/or clients 104 to communicate with each other despite their different proprietary languages and communication protocols, and may provide the user with control over most or all the hardware from a single client. The application may utilize at least one portion of the hardware to send commands to the devices 102 and receive feedback from them. The application integrates centralized device control into a PC based media environment (e.g., Microsoft Windows XP Media Center™ or Microsoft Windows Vista™ environment) that may store, organize and play digital media content. The user may use the remote control 39 or the portable device 106 to listen to music, watch and record television, enjoy family photographs and home movies, as well as adjust the lighting, secure the home, adjust the temperature, distribute music throughout the house, check surveillance cameras and the like. Moreover, the portable device 106 has further communication features as noted below.

The application may be implemented with Web Services. The Web Services use standard Internet protocol (IP) and are based on standard XML-related technologies such as SOAP (Simple Object Access Protocol) for communications and WSDL (Web Services Device Language) to describe interfaces. The devices implemented with Web Service for Device (WSD) become black boxes on the network, providing services to any application, on any platform, written in any language. Moreover, the use of WSD allows for the capabilities of Universal Plug and Play (UPnP) that seamlessly connects and simply implementation as is known in the art.

The invention is directed to the logging functionality of the CAS to monitor the processes and interactions taking place within the CAS. The log files generated by the CAS application may be used by a user, installer, technical support staff and/or the like for monitoring, tracing and diagnostic CAS operations. The messages in the log files may contain text that indicates what the message is for and the systems or processes involved.

Logging may be initiated by setting the CAS to trace the logging, which may be a default setting for the CAS operation during the CAS configuration. System integrators may use the log files and the reference information to help troubleshoot a problem in the field successfully or be of assistance in solving a problem by relaying information from the log files to the CAS technical support staff.

The device/software modules, methods or implementations described herein are intended for operation with dedicated hardware implementations including, but not limited to, semiconductors, application specific integrated circuits, programmable logic arrays, and other hardware devices constructed to implement the software modules, methods or implementation functionality described below. Moreover, various embodiments of the invention described herein are intended for operation as software programs running on a computer processor such as PC running the Windows™ operating system as is well known in the art. The functional and operational description of the various device/software modules, methods or implementations described herein may be used together, separately, or in various combinations thereof. The device/software modules, methods or implementations will now be described in detail.

CAS Log Viewer

The logging system used in CAS may generate standard text-based files that are automatically read from the moment the CAS is initiated at startup until the final execution of shutdown. Depending on the period of time they cover, log files may become quite large as they capture all activity of the application. The CAS Log Viewer is an application created to assist the users in filtering through the log messages to find those relevant to the issue he or she is trying to troubleshoot.

Figure 2:
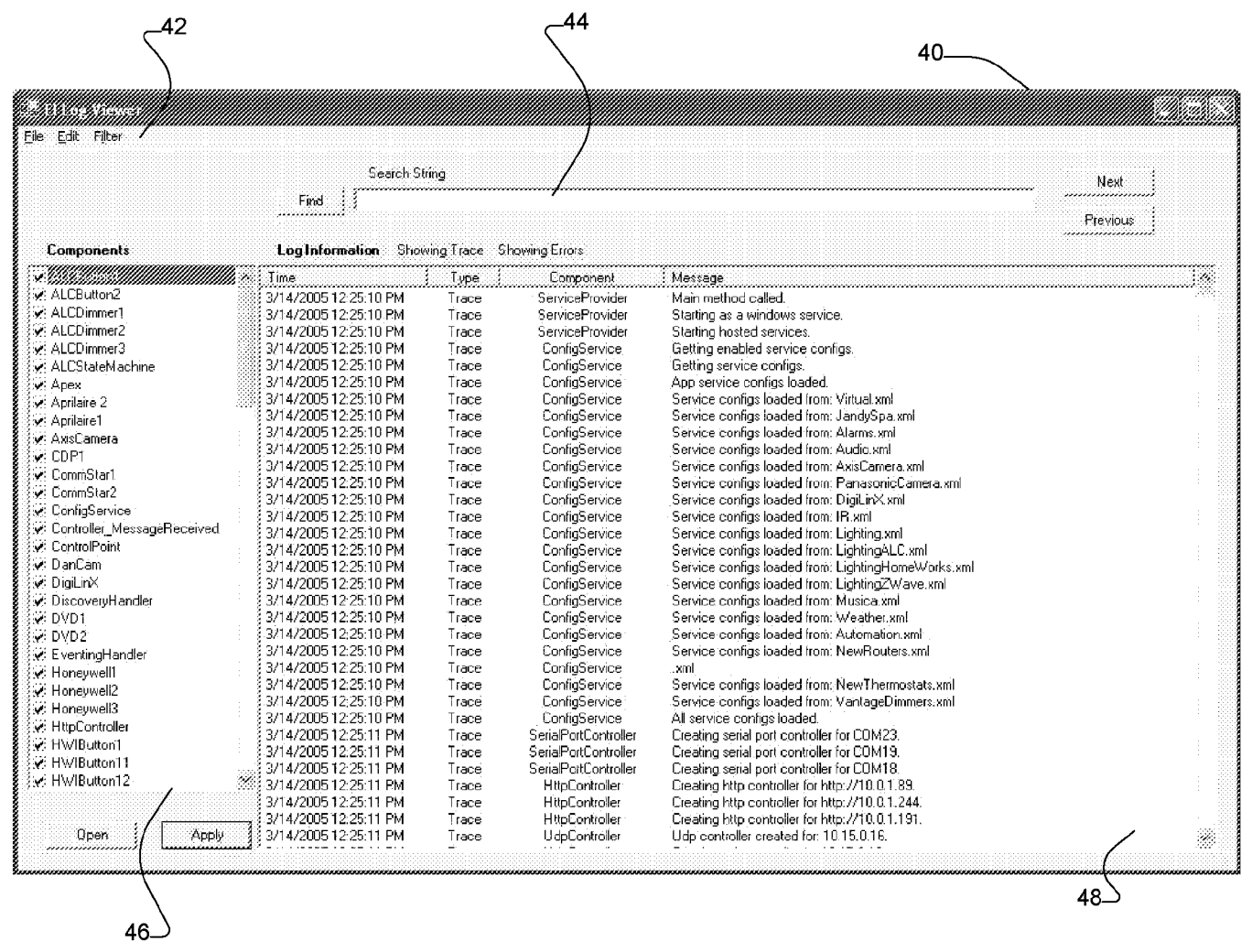

FIG. 2 shows an exemplary log viewer 40 constructed according to the principles of the invention. The log viewer 40 of the invention may be integrated with the control panel of a Windows™ operating system or implemented as a utility program in a CAS program group. The log viewer 40 may be started by opening Windows Explorer™, navigating to the control panel or a CAS program folder on the local drive, and double-clicking the corresponding executable file or program (e.g., logviewer.exe). The user may navigate the log viewer 40 using a mouse, keyboard, input device, or the like. As shown in FIG. 2, the log viewer 40 of the invention may include several elements such as a menu bar 42, search box 44, component pane 46 and/or log information pane 48 and the like.

Figure 3:
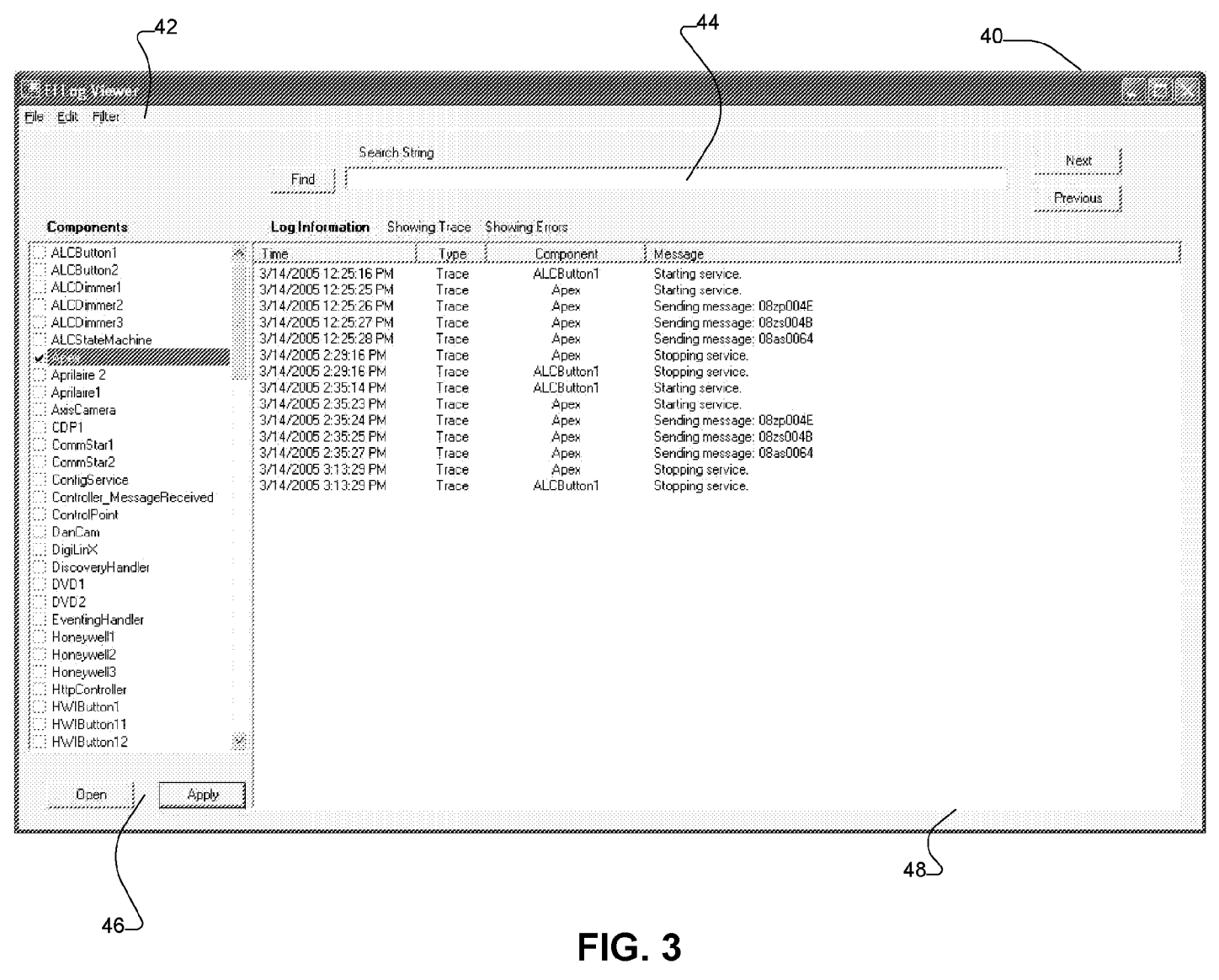
Figure 4A:
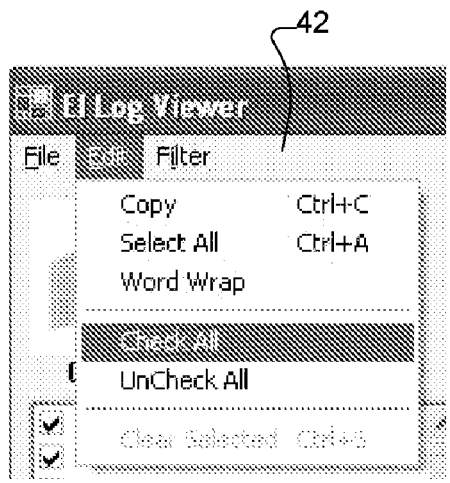
FIG. 4(a) shows a screen capture images of the log viewer of FIG. 2 being used to display all messages.
Figure 4B:
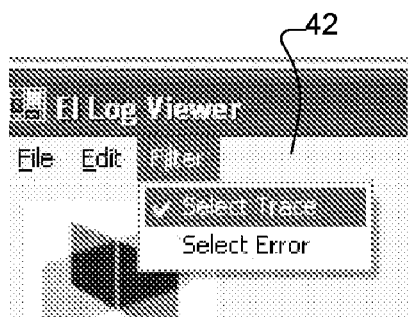
FIG. 4(b) shows a screen capture image of the log viewer of FIG. 2 being used to display only trace messages.
Figure 4C:
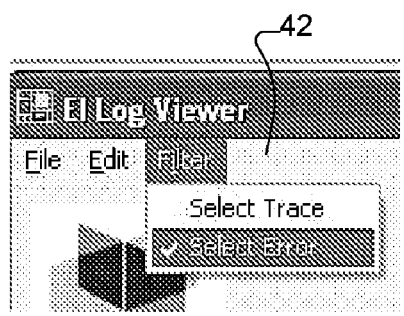
FIG. 4(c) shows a screen capture image of the log viewer of FIG. 2 being used to display only error messages.

To view a log, the user may select "File" and "Open" in the menu bar 42, and then browse to the log file. The log viewer 40 may allow the user to isolate messages pertaining to a specific system component. As shown in FIG. 3, to view only the messages for a specific component the user may click the box to the left of a component to place a check beside the component in the components pane 46 and then select "Apply." Additional filtering functionality may include the ability select multiple components for viewing. For example, in FIG. 4(a), the user may select "Edit" and "Check All" to see all messages, or select "Edit" and "UnCheck All" to clear the selected messages. Also, the user may select "Filter" and "Select Trace" to show only 'trace messages' as shown in FIG. 4(b). Further, the user may select "Filter" and "Select Error" to show only 'Error Messages' as shown in FIG. 4(c).

The log messages in the log information pane 46 may be sorted by content headings such as time, type, component (alphabetical sort), message content (alphabetical sort) or the like, as shown in FIG. 5. To sort on one of these criteria, the user may simply select the heading 5 he or she wants, and then the messages may be sorted according to the selected heading. Selecting the same heading again may resort in reverse chronological or alphabetical order from the original sort.

Figure 6A:
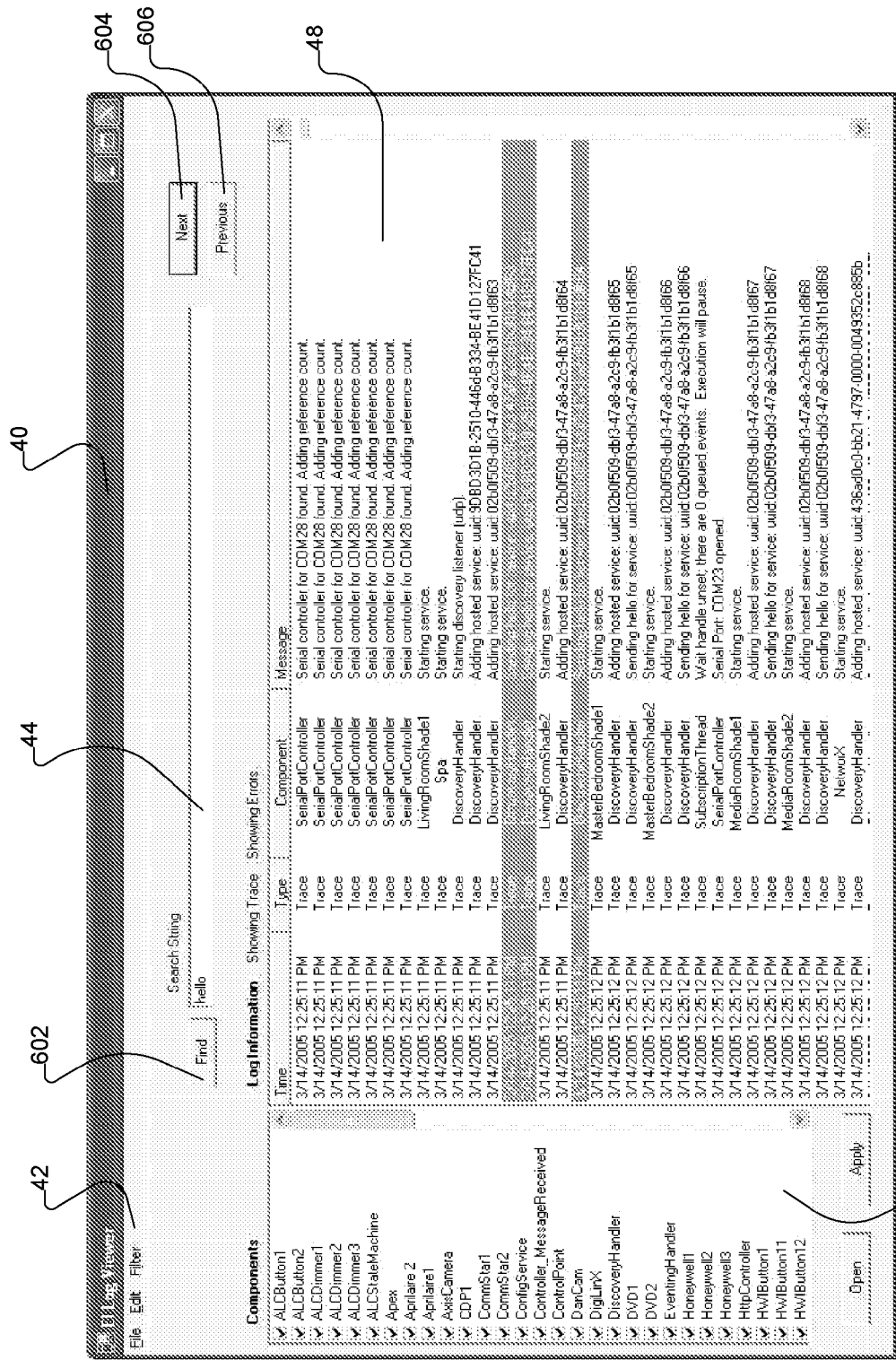
FIG. 6(a) shows a screen capture image of the log viewer of FIG. 2 being used to search messages.
Figures 6B, 6C:
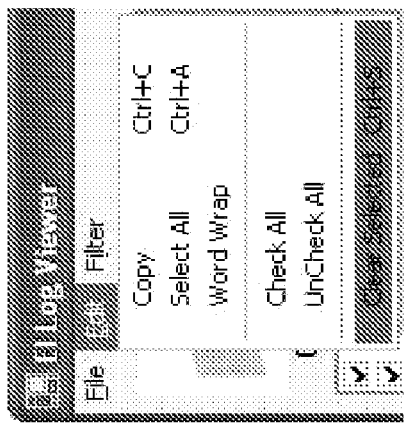
FIG. 6(b) shows a screen capture image of the log viewer of FIG. 2 being used to clear the selected messages.
FIG. 6(c) shows a screen capture image of the log viewer of FIG. 2 being used to display an expanded stack trace for an error massage.
Figure 6D:
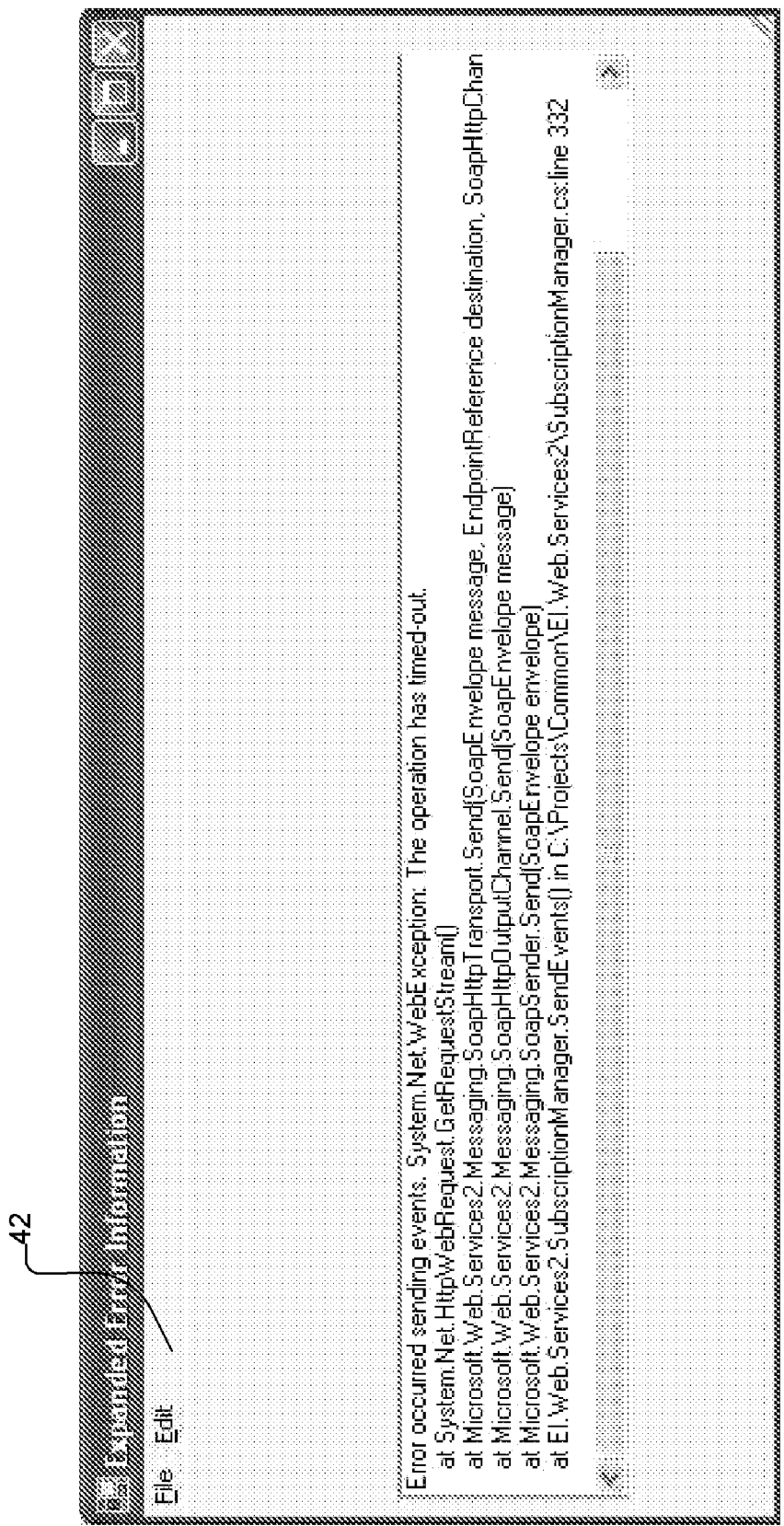
FIG. 6(d) shows a screen capture image of a dialog box showing additional information about the error when a user selects "Show Expanded Errors" in FIG. 6(c)

In FIG. 6(a), the user may search for specific strings of text within messages, and matching results may be highlighted within the log information window 48. To conduct a search, the user may enter a term in the search box 44 and select "Find" 602 and select "Next" 604 to continue to move through matching results or select "Previous" 606 to backtrack through them. To clear the highlighted messages, the user may select "Edit" and "Clear Selected" as shown in FIG. 6(b). To select multiple, consecutive messages, the user may press the SHIFT key while clicking on the desired beginning and ending messages. To select multiple, nonconsecutive log messages, the user may press and hold the CTRL key while clicking on desired messages. The user may see an expanded stack trace for an error message by highlighting the error, right-clicking and selecting "Show Expanded Errors" as shown in FIG. 6(c). Then, an "Expanded Error Information" dialog box may appear with additional information about the error, as shown in FIG. 6(d), which may be printed as a report by selecting "File" and "Print" from the menu bar 42.

Figure 7A:
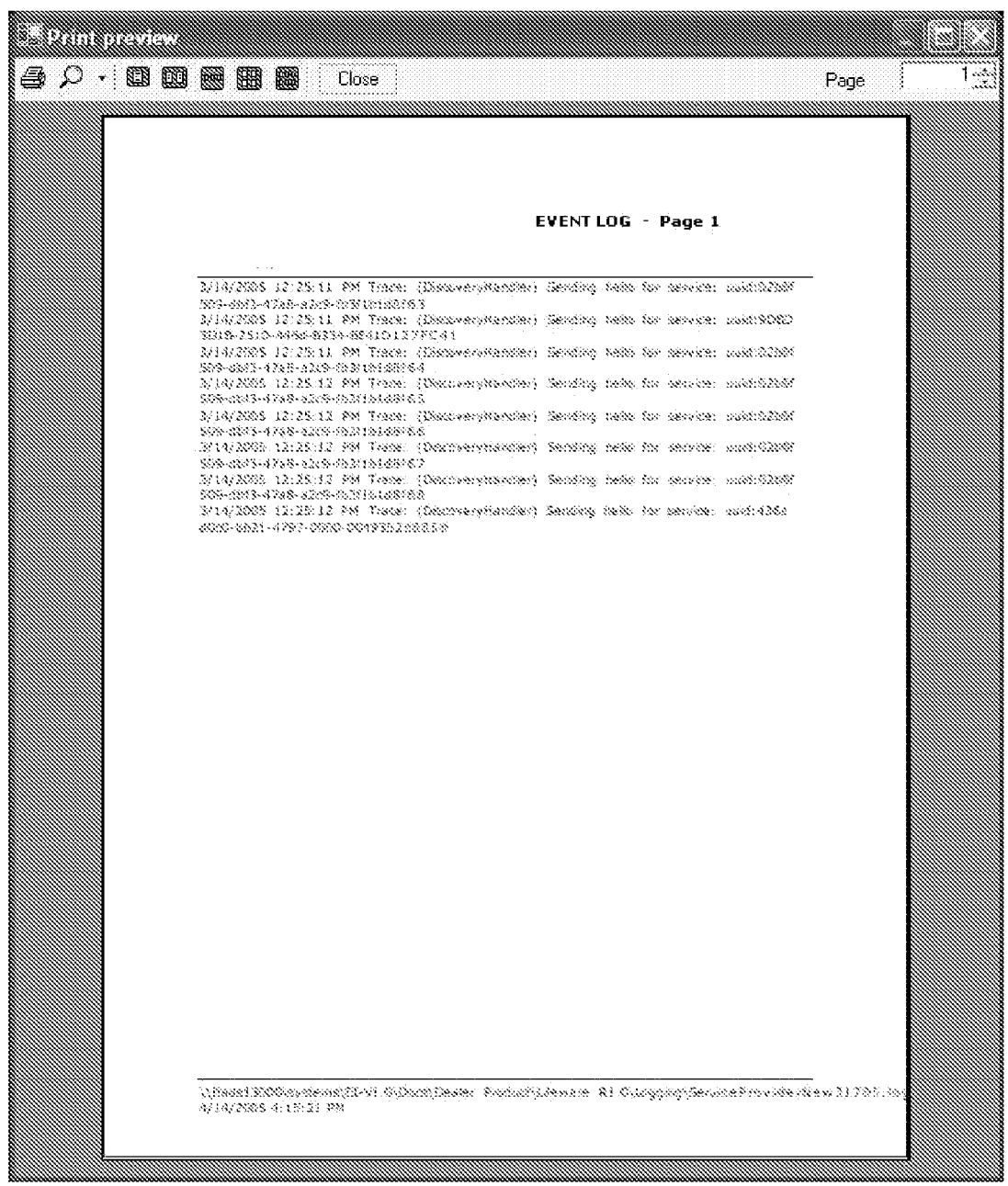
FIG. 7(a) shows a screen capture image of a print preview window constructed according to the principles of the invention.

The user may print reports based on selected messages using the "File" and "Print" command from the menu bar 42. To preview a report, the user may select "File" and "Print Preview," and a "Print Preview" window may appear as shown in FIG. 7(a). To change page setup for a report, the user may "File" and "Page Setup" from the menu bar 42, and then a "Page Setup" window may appear as shown in FIG. 7(b). To turn word wrapping on or off for a report, the user may select "Edit" and "WordWrap" from the menu bar 42. As shown in FIG. 7(c), word wrapping may break a line at a natural word break, rather than between characters within a word.

Interpretation of Log File Messages

Figure 8A:
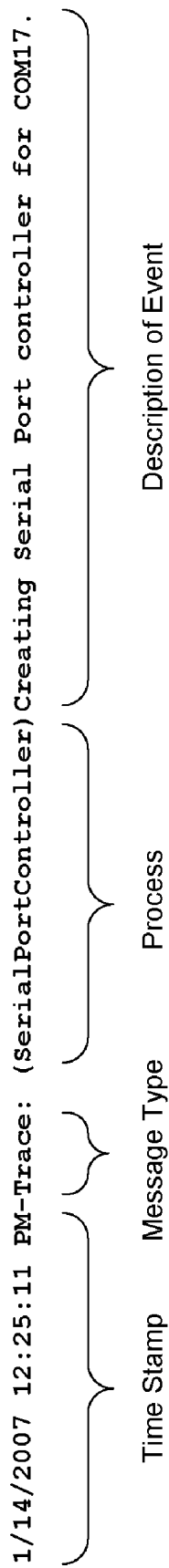
FIG. 8(a) shows an exemplary trace message having four core components constructed according to the principles of the invention.

Each message may be represented by a unique line of text in the log file. A message may be either a 'Trace' message (detailing an event) or an 'Error' message (detailing an error). Regardless of the type, there may be four core components to a message: Time Stamp, Message Type, Process issuing the message and a Description. The sample shown in FIG. 8(a) is a trace message that indicates that at 12:25, a Serial Port Controller created a controller for the COM17 port. As another example, a command sent to a specific thermostat and being successfully received by the thermostat may be represented in the following two messages:

3/14/2005 2:35:24 PM—Trace: (Aprilaire 2) Sending message: SN2 C8=ON

3/14/2005 2:35:24 PM—Trace: (Aprilaire 2) Message received: SN2 C8=ON

It may not be uncommon in the log that an anticipated "message received" line follows just after a "sending message" line. However, because there are so many systems that can be supported by the CAS and large numbers of messages may be transmitted almost simultaneously, there may be a variety of other logged messages from other devices occurring between the two. In fact, if something occurs that affects multiple areas of the software, the user may see hundreds of log messages with the exact same time stamp on them.

For the most part, the information and entries contained in the logs may be in the form of trace messages used to track the progress of transactions and interactions between the internal processes of the CAS. These trace messages may be sent and received by services and processes within the CAS in response to requests made by internal and external components. Because of the multitude of different systems the CAS supports, each with its own unique messaging needs, a comprehensive detail of all of the possible trace messages may be extensive and unwieldy. To address this issue, trace messages may contain intuitively labeled components. While the exact command being sent to or from a device may not be understandable, the user may be able to determine when the command was sent and if it was received, which may be the most relevant information to system installers.

Much of the information logged by the CAS may detail the interactions between different components of the software. Knowing the basic functions of these components and their relationship may assist the user in understanding the log. For each device 102 (e.g., lighting 26, HVAC 29, etc), there may be a corresponding 'service' in the CAS that facilitates control (a lighting service, HVAC service, etc). When the CAS is started, the necessary services are also started. Events such as "Starting service" or "Adding Hosted Service" may indicate that a service has been started. Other Service-related messages may include "Configuration is loaded," "Controller is created," "Controller is found," "Starting Service," "Adding Hosted Service," "Sending Hello for service," and the like.

Once started, a service may need to advertise its presence to the rest of the software. The other software components may be then aware that a new service (and thus, a new device) is now on the network. At the startup, advertisement may be done by issuing a 'hello' (i.e., "Sending Hello" for Service), and other components may indicate that they have heard this 'hello' (i.e., "Hello received") in response, which is referred to as 'discovery' in the CAS. If the service is being started after initial startup has been completed, in lieu of a hello message, a 'Probe' may be sent. Other system components then may send 'Probe Matches' in response. Messages such as "Probe Received" and "Sending Probe Matches" may indicate that a service has been added and discovered successfully. Discovery related messages may include "Sending Hello," "Hello Received," "Probe Received," "Sending Probe Matches," and the like.

Messages that involve sending a command to a device and receiving a response may be found close together. Common trace messages involved in this process may include "Sending Message," "Message Received," "Received Non-conforming Message" (i.e., when a device returns more information than is required by the CAS), "Received Null Event" (i.e., when a device does not return messages in response to commands from the CAS), "Getting Script Template," and the like.

A number of trace messages may refer to 'Subscription Management.' For example, when the user accesses device controls, for example, lighting controls, some components of the software then may automatically subscribe to events issued by the lighting service. When the user navigates off of the lighting controls page, the components may unsubscribe from the lighting service. If a service is stopped or shut down, all of its existing subscriptions may be cleared. These processes of subscription and unsubscription may be captured in the log. For troubleshooting purposes, subscription messages may indicate either successful communication between components and services, or that a service has been stopped or shut down and its subscriptions cleared. Common trace messages dealing with subscriptions may include "Sending Unsubscribe," "Removing Subscription," "Clearing subscriptions," "Subscriptions cleared" and the like. The table shown in FIG. 10 lists the common trace messages alphabetically by the first letter of the message text.

Figure 8B:
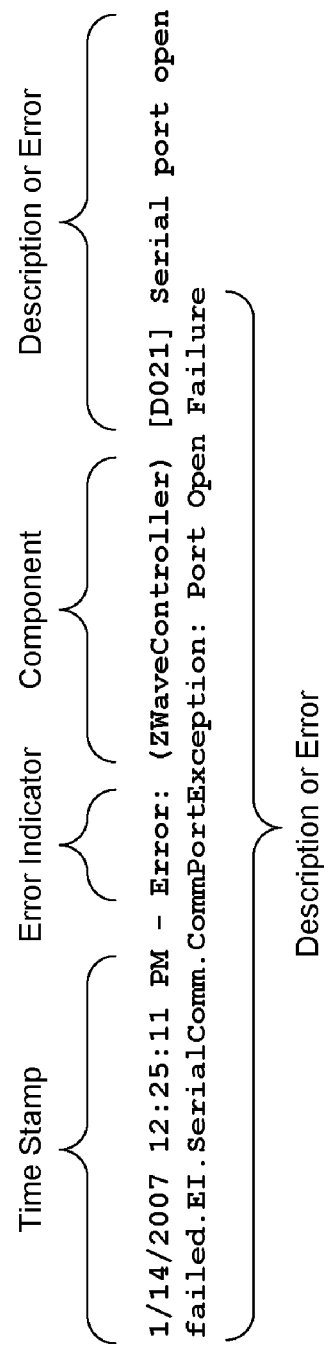
FIG. 8(b) shows an exemplary error message having four core components constructed according to the principles of the invention.

The log file also may receive error messages that are generated when expected conditions are not met or unexpected conditions arise in the system. Error messages may also be generated when exceptions occur within the software as the result of a failed transaction or a missing or incorrect address or port. When errors occur, log entries may be generated that may be interpreted either by integrators or by technical staff in the course of troubleshooting the problem. An exemplary error message is shown in FIG. 8(b), which is similar to the trace message shown in FIG. 8(a). An error messages may be identified by the 'message type' category, which may includes "Error" as shown in FIG. 8(b). Error Messages may fall into several categories such as configuration errors, networking errors, missing system files, scripting/scheduling errors and the like.

The configuration errors may be related to the settings of a device or the trigger attempting to initiate control of the device. Log errors indicating a possible configuration problem may include "Could not create an instance of this type," "Error occurred sending events," "Error occurred sending message," "Partition Name Invalid," "Application setting has an invalid value," "Zone Name Invalid," "Network device not responding," "Received restore for zone X which does not have partition mapping," "Received alarm for zone X, which does not have partition mapping," "Port Open Failure" and the like. The table shown in FIG. 11(b) lists the configuration error messages alphabetically by the first letter of the message text.

Some log errors may indicate a problem with the network such as a possible failure to communicate between the software and physical devices. Such problems may have a physical cause, for example, an unplugged or poorly fitted cable. The problem could also be an addressing issue such as a wrong serial port number for a device, or an incorrect IP Address. Log errors that indicate a possible networking problem may include "An error has occurred sending the probe message," "Error occurred sending events," "Error sending bye message," "Error sending hello message" and the like. The table shown in FIG. 11(a) lists the network error messages alphabetically by the first letter of the message text.

Other error messages may indicate that a necessary DLL or system file is missing. In this case, the user may need to check the installation against the required file structures and/or the latest available CAS system files to ensure that all of the necessary system components are present. Log errors that indicate a possible missing system file may include "Type could not be loaded. Please check to make sure the file containing X is in the bin directory," "The constructor for X has thrown an exception. Please check to make sure the file containing Y is in the bin directory," "Could not create device" and the like. The table shown in FIG. 11(d) lists the missing system error messages alphabetically by the first letter of the message text.

An error in the script or scheduling of a script may trigger one of the following log errors: "Could not retrieve script templates," "Could not load schedules as the config file is corrupt," "Could not execute schedule," "Could not save schedules to file," "Could not compile script," "Execution of script X received an error," "Cannot perform action, script is in use" and the like. If the user sees one of these scripting/scheduling errors, he or she may need to check the script or schedule setup using either a CPA configuration tool or control panel. The table shown in FIG. 11(c) lists the script/schedule error messages alphabetically by the first letter of the message text.

An error condition is may not always accompanied by an error message. For example, problems such as faulty or unplugged communications cables may generate log trace messages that show timeout conditions because a command could not get through. The most common indicator of a non-responsive, non-error may be the 'Null Event trace message.'

The logging system used in CAS may generate standard text-based files that are automatically read from the moment CAS is initiated at startup until the final execution of shutdown. These files may be viewed directly as text files. The logging system may place log files in the Logs directory under the Applications folder on the CAS server 10. To access these log files, one may need the CAS administrator permissions, Windows Explorer™, a text reader or editor. Altering information in the log files may have no effect on the system as the messages are evidence of events which have already occurred and are only a record of them. To view log files, the user may use a text editor such as Notepad to open the file and view the messages as in an exemplary log file shown in FIG. 9.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable storage medium tangibly embodying instructions may be used in implementing the methodologies described herein. For example, software codes may be stored in a memory, for example the memory of client or device, and executed by a processor, for example a general-purpose processor. Memory may be implemented within the processor or external to the processor. As used herein the term "memory" refers to any type of long term, short term, volatile, nonvolatile, or other memory and is not to be limited to any particular type of memory or number of memories, or type of storage media upon which memory is stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A convergence and automation system, comprising:
an Internet-protocol (IP) based network; and
hardware implemented with a web service for devices (WSD) protocol, said hardware comprising:
a plurality of devices connected to the network, each device being configured to perform at least one service; and
a server connected to the network and configured to control the plurality of devices to converge and automate the at least one service;
said hardware being configured to establish communication among the server and the plurality of devices and perform a logging function to record an event and an error occurring in the convergence and automation system,
wherein said logging function comprises generating a message describing the event and error occurring in the convergence and automation system,
wherein said message comprises:
a trace message describing the event; and
an error message describing the error,
wherein said error message comprises:
a configuration error message comprising a record of an error related to a setting or a triggering of at least one of the plurality of devices;
a network error message comprising a record of an error related to a communicate failure between the hardware and the software;
a missing system file message comprising a record of an error related to a missing file; and
a scripting/scheduling error message comprising a record of an error related to a script or a scheduling of the script.

2. The convergence and automation system of claim 1, said hardware further comprising at least one client connected to the network and configured to control at least a portion of the at least one service.

3. The convergence and automation system of claim 2, wherein each of said plurality of devices is selected from the group comprising an audio device, a video device, an intercom device, a lighting control device, a security device and a heating ventilation air conditioning (HVAC) device.

4. The convergence and automation system of claim 2, wherein said at least one client is selected from the group comprising a television, a personal computer, a personal data assistant and a remote controller.

5. The convergence and automation system of claim 1, wherein said message comprises a time stamp component, a message type component, a process component, and a description of event component.

6. The convergence and automation system of claim 1, wherein the trace message comprises:
a service-related message comprising a record of an event related to said at least one service;
a discovery message comprising a record of an event related to introduction and acknowledgement of a new service in said software;
a messaging message comprising a record of an event related to communication among said plurality of devices; and
a subscription management message comprising a record of an event related to a subscription history of said at least one service.

7. The convergence and automation system of claim 1, said logging function further comprising filtering, sorting and searching said message.

8. The convergence and automation system of claim 7, wherein the logging function further comprises printing a report of said message.

9. A computer readable storage medium having a stored computer program embodying instructions, which, when executed by a computer, cause the computer to perform a logging function to record an event and an error occurring in a convergence and automation system, said convergence and automation system comprising an Internet-protocol (IP) based network and hardware implemented with a web service for devices (WSD) protocol, the computer readable storage medium comprising:
instructions for establishing communication in the hardware based on the WSD protocol; and
instructions for performing the logging function to record the event and the error, wherein said hardware comprises:
a plurality of devices connected to the network, each of the plurality of devices being configured to perform at least one service; and
a server connected to the network and configured to control the plurality of devices for converging and automating the at least one service, wherein said instructions for establishing communication in the hardware comprise instructions for establishing communication among the server and the plurality of devices,
wherein said instructions for performing the logging function comprise instructions for generating a message describing the event and the error,
wherein said message comprises a time stamp component, a message type component, a process component, and a description of event component,
wherein said message comprises:
   a trace message describing the event; and
   an error message describing the error,
wherein said error message comprises:
   a configuration error message recording an error related to a setting or a triggering of the plurality of devices;
a network error message recording an error related to a communicate failure between the hardware and software;
a missing system file message recording an error related to a missing file; and
a scripting/scheduling error message recording an error related to a script or a scheduling of the script.

10. The computer readable storage medium of claim 9, the trace message comprising:
   a service-related message comprising a record of an event related to the at lest on service;
   a discovery message comprising a record of an event related to introduction and acknowledgement of a new service in the software;
   a messaging message comprising a record of an event related to communication among said plurality of devices; and
   a subscription management message comprising a record of an event related to a subscription history of said at least one service.

11. The computer readable storage medium of claim 9, the logging function further comprising filtering and searching the message.

* * * * *

UNITED STATES PATENT AND TRADEMARK OFFICE
CERTIFICATE OF CORRECTION

PATENT NO. : 7,496,627 B2  
APPLICATION NO. : 11/686884  
DATED : February 24, 2009  
INVENTOR(S) : Seale Moorer et al.

Page 1 of 1

It is certified that error appears in the above-identified patent and that said Letters Patent is hereby corrected as shown below:

Title Pg, Item (56) Ref. Cited, add U.S. Patent No. 7,170,422 issued January 2007 to NELSON, *et al.*; and U.S. Publication No. 2005/0262227 issued November 2005 to HELLER, *et al.*

Signed and Sealed this

Twenty-fifth Day of August, 2009

David J. Kappos
*Director of the United States Patent and Trademark Office*